(12) United States Patent
Ramos

(10) Patent No.: US 8,555,593 B2
(45) Date of Patent: Oct. 15, 2013

(54) FIRE PROTECTION SYSTEM FOR WIDE FLANGE STEEL COLUMNS AND BEAMS

(76) Inventor: Proceso P. Ramos, Pasig (PH)

( * ) Notice: Subject to any disclaimer, the term of this patent is extended or adjusted under 35 U.S.C. 154(b) by 0 days.

(21) Appl. No.: 13/821,484

(22) PCT Filed: Nov. 16, 2011

(86) PCT No.: PCT/PH2011/000021
§ 371 (c)(1),
(2), (4) Date: Mar. 7, 2013

(87) PCT Pub. No.: WO2012/105858
PCT Pub. Date: Aug. 9, 2012

(65) Prior Publication Data
US 2013/0167475 A1    Jul. 4, 2013

(30) Foreign Application Priority Data
Jan. 31, 2011   (PH) .............................. 1-2011-00027

(51) Int. Cl.
*E04B 2/28*   (2006.01)
(52) U.S. Cl.
USPC ........................................................ 52/489.1
(58) Field of Classification Search
USPC ............. 52/364, 489.1, 489.2, 714, 834
See application file for complete search history.

(56) References Cited

U.S. PATENT DOCUMENTS

| | | | | |
|---|---|---|---|---|
| 2,213,603 | A * | 9/1940 | Young et al. ................. | 52/344 |
| 3,748,815 | A * | 7/1973 | Parker ........................... | 52/714 |
| 3,998,028 | A * | 12/1976 | Pelletier et al. .............. | 52/834 |
| 4,484,427 | A * | 11/1984 | Crites et al. .................. | 52/261 |
| 4,541,219 | A * | 9/1985 | Parker ........................... | 52/713 |
| 4,584,811 | A * | 4/1986 | Balinski ........................ | 52/714 |
| 4,596,094 | A * | 6/1986 | Teller et al. .................. | 52/98 |
| 4,696,137 | A | 9/1987 | Schleich | |
| 4,854,107 | A * | 8/1989 | Roberts ........................ | 52/834 |
| 6,067,691 | A * | 5/2000 | Feltman ....................... | 24/295 |
| 6,637,172 | B2 * | 10/2003 | Bousquet ..................... | 52/714 |
| 8,028,495 | B2 * | 10/2011 | Knauf ........................... | 52/850 |
| 8,132,383 | B1 * | 3/2012 | Herrmann et al. .......... | 52/489.1 |
| 2003/0051431 | A1 * | 3/2003 | Bousquet ..................... | 52/712 |

FOREIGN PATENT DOCUMENTS

| | | |
|---|---|---|
| AU | 2002300530 B2 | 3/2007 |
| JP | 08165740 A * | 6/1996 |
| WO | 99/35352 A1 | 7/1999 |

OTHER PUBLICATIONS

International Search Report dated May 31, 2012, as issued in corresponding Philippines Patent Application No. PCT/PH2011/000021, as filed Nov. 16, 2011 (4 pages).

\* cited by examiner

*Primary Examiner* — Christine T Cajilig
(74) *Attorney, Agent, or Firm* — Maier & Maier, PLLC

(57) ABSTRACT

This invention relates to a fire protection of structural columns and beams but more particularly to a fire protection system of wide flange steel columns and beams by means of a plurality of gypsum boards be secured to a full length slip-on encasement frames attached to a wide flange column or beams.

5 Claims, 9 Drawing Sheets

FIRE PROTECTION SYSTEM FOR WIDE FLANGE STEEL COLUMNS AND BEAMS

RELATED APPLICATIONS

This is the U.S. national stage application which claims priority under 35 U.S.C. §371 to International Patent Application No.: PCT/PH2011/000021 filed on Nov. 16, 2011, which claims priority to Philippine Patent Application No. 12011000027 filed on Jan. 31, 2011, the disclosures of which are incorporated by to reference herein their entireties.

TECHNICAL FIELD OF THE INVENTION

This invention relates to a fire protection of structural columns and beams but more particularly to a fire protection system of wide flange steel columns and beams by means of a gypsum board being secured to a full length slip-on encasement frame being attached to the wide flange steel column or beam.

BACKGROUND OF THE INVENTION

The use of fire protection system and reinforcement materials particularly in construction for preventing and controlling the damage of fire has gained increasing importance in recent years especially for high-rise buildings and structures.

Immediate breakdown and collapse of a building during fire may be prevented by providing fire protection to structural elements particularly to wide flange columns and beams.

One good example of high rise structure that collapsed due mainly to insufficient fire protection was the World Trade Center. Based on study published by the United States' National Institute of Standard and Technology (NIST) dated July 2004, there is a need to develop an improved system and methodology in structural steel fire protection wherein the use of gypsum board was recommended. However, installation of gypsum boards are often difficult to install which prompted the inventor to conceived the subject invention.

One way of protecting a building from immediate collapse is featured in U.S. Pat. No. 4,696,137 wherein a beam-support junction for mounting and supporting a girder is disclosed wherein the compartments of I-beam or T-beam are filled with concrete and the means for connecting the columns to the flanges are by welding. Concrete are known to withstand heat caused by fire. However, only the compartment portions of the beam are filled with concrete aside from the fact that concrete induces a considerable amount of weight to the system particularly to the beams. Moreover, the welding operation requires more working time and manpower.

Another system for fireproofing beams in budding structures is disclosed in U.S. Pat. No. 4,584,811 which comprises a furring bracket being clipped to the steel beam flanges wherein the steel beam being sprayed with fireproofing coating. This spray coating, however, was proven to provide less fire protection as compared to installing a gypsum board being employed in subject invention. Another problem with this prior art is that the application of said furring bracket is limited and is designed particularly for elevator hoist system and not for wide flanged columns and beams.

It is therefore an object of this invention to provide a fire protection system for wide flange steel columns and beams by means of a fire-rated gypsum board being secured to a specially designed encasement and lipped frames.

Another object of this invention is to provide a fire protection system for wide flange steel columns and beams that can protect the building structure for up to four hours fire rating.

Still, an object of this invention is to provide a fire protection system for wide flange steel columns and beams that is easy to manufacture.

Also an object of this invention is to provide a fire protection system for wide flange steel columns and beams that is easy to install.

Yet, an object of this invention is to provide a fire protection system for wide flange steel columns and beams using lightweight materials.

Moreso, an object of this invention is to provide a fire protection system for wide flange steel columns and beams engineered for high-rise buildings and structures.

Further object of this invention is to provide a fire protection system for wide flange steel columns and beams that is designed to protect beams and columns of different flange thickness.

BRIEF DESCRIPTION OF THE DRAWINGS

These and other advantages can become readily apparent by reading the detailed description in light of the accompanying drawing wherein.

DETAILED DESCRIPTION OF THE INVENTION

Figure 1:
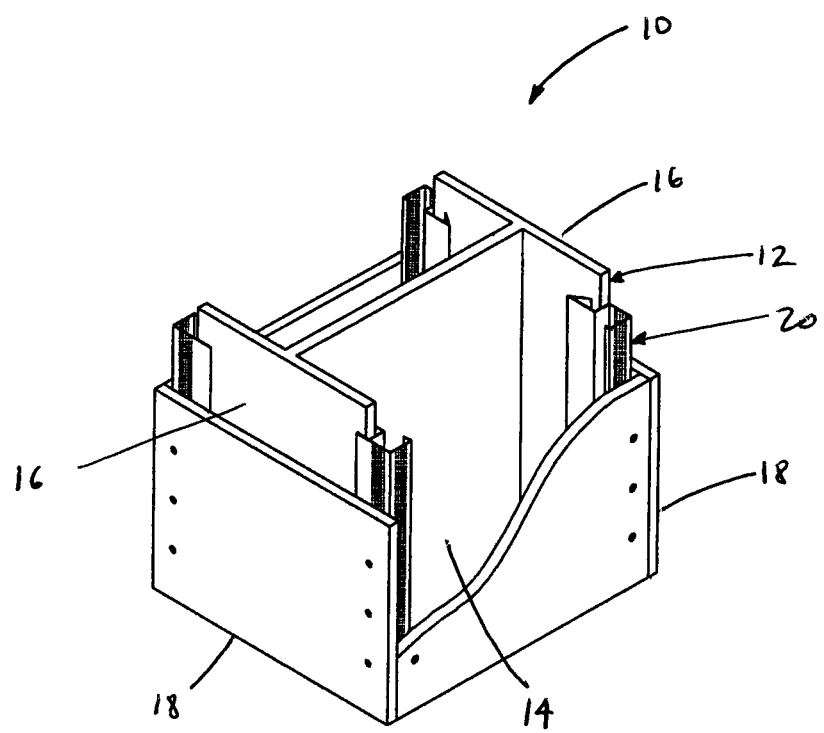
FIG. 1 shows the perspective view of fire protection system for wide flange steel column according to the present invention.

Referring now to the drawings in detail, there is shown in FIG. 1 a fire protection system for wide flange steel column generally designated as 10.

Column system 10 comprises a wide flange column 12 being defined by a vertical web 14 and a pair of laterally opposing flanges 16 extending at right angles from vertical web 14.

At least four slip-on encasement frame 20 is shown in FIG. 1, wherein each encasement frame 20 being attached longitudinally to flanges 16 by slipping which means that flange 16 should forcefit into said encasement frame 20. Further details on attachment of encasement frame 20 to flange 16 are discussed in succeeding paragraphs.

Ideally, encasement frame 20 is of "full-length" which means that its length is the same as the length of the column 12. However, modifications as to the size and quantity of encasement frame 20 can be done easily by person skilled in the art without departing from the scope of this invention. It can be shortened, then, increased in quantity and disposed in series depending on the length of the flange 16.

Figure 2:
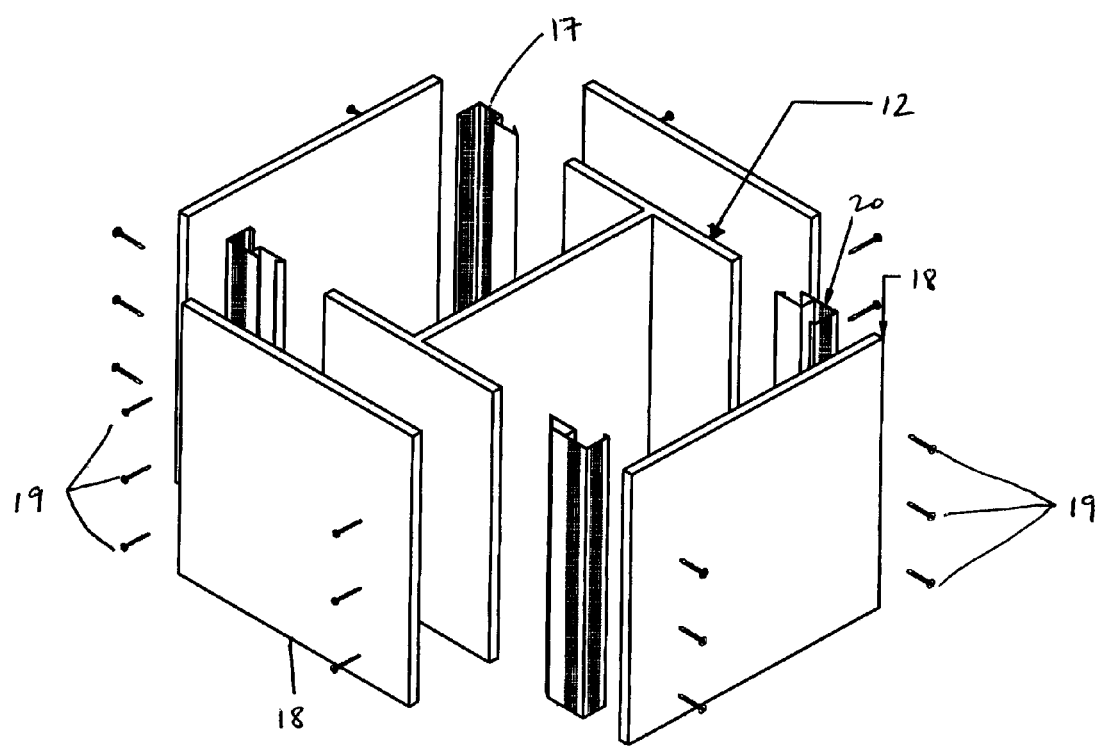
FIG. 2 shows the exploded view of fire protection system for wide flange steel column according to the present invention.

FIG. 2 shows the exploded view of column system 10 depicting in details the manner of connections of encasement frames 20 and gypsum boards 18 to wide flange column 12.

Figure 9:
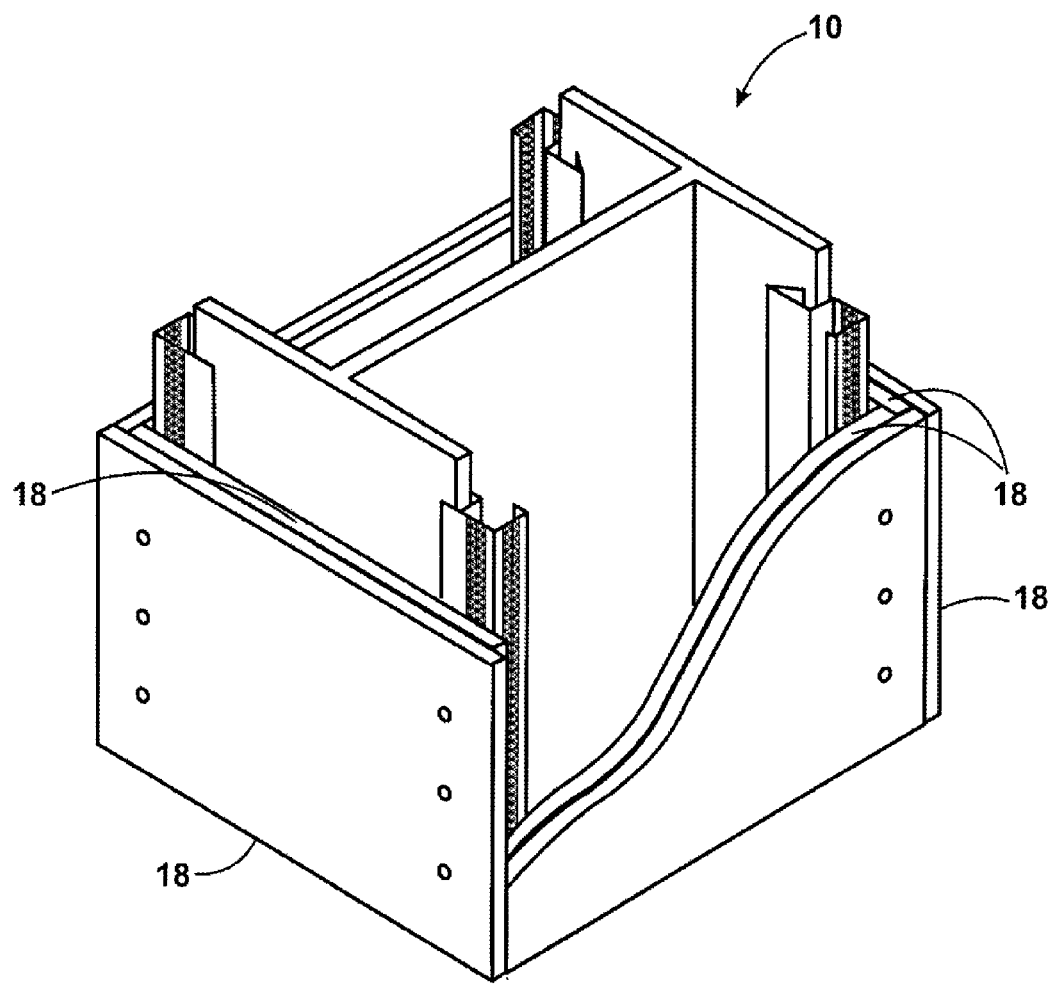
FIG. 9 is the perspective view of fire protection system for wide flange steel column showing multi-layered gypsum boards according to the present invention.

Gypsum boards 18 are fire-rated. As shown in FIGS. 1 and 2, at least four gypsum boards 18 are being used in a single layer of enclosure but it can be increased into a multi-layer depending on fire-ratings as shown in FIG. 9. For example, it can be a two layer as depicted in FIG. 9 which means that 8 gypsum boards 18 are needed to double the layer. However, the two layer gypsum board 18 being shown in FIG. 9 is for illustrative purpose only and not intended to limit the scope of the invention. Any person skilled in the art can easily increase the layer to More than two-layer. Preferably, gypsum boards 18 is secured to encasement frames 20 by means of plurality of screws 19 wherein encasement frames 20 are provided with knurlings 17 for easy screwing.

Figure 7:
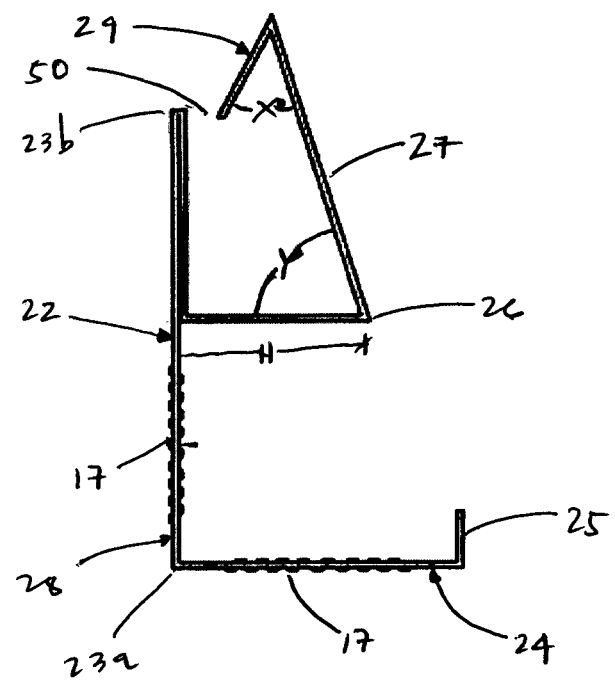
FIG. 7 shows the sectional view of the clip-on encasement frame according to present invention.
Figure 11:
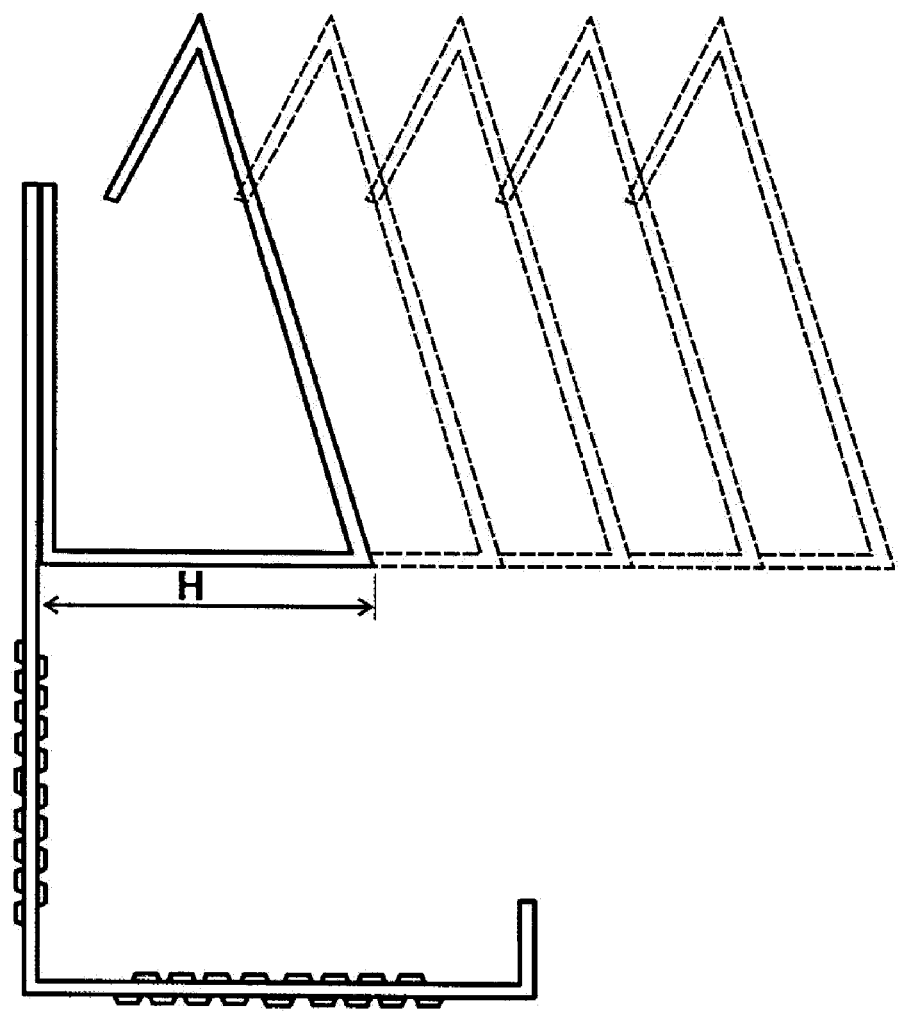
FIG. 11 is the clip-on encasement frame showing the clamping arm having a variable length.

In FIG. 7, there is shown the sectional view of the slip-on encasement frame 20. Encasement frame 20 is defined by an upright base 22 having a pair of lateral ends 23a and 23b. A first bracket arm 24 is transversely provided at one of said ends particularly lateral end 23a. A bracket lip 25 extends inwardly from first bracket arm 24 towards the other lateral end 23b. A first clamping arm 26 is being disposed in parallel to first bracket arm 24 at a predetermined location between lateral ends 23a and 23b thereby defining a second bracket arm 28 between said first bracket arm 24 and said first clamping arm 26. As shown in FIG. 11, the length "H" of first clamping arm 26 varies depending on the thickness of flange 16. The variable length is represented by a broken line. In actual, standard preferred size of length "H" ranges from 23 mm to 63 mm. A second clamping arm 27 extends at an acute angle "Y" from said first clamping arm 26 and being away from first bracket arm 24. Slip-on arm 29 extends angularly from said second clamping arm 27 towards the first clamping arm 26 at an acute angle "X". Angles "X" and "Y" are preferably 40° and 75° respectively for a 23 mm length "H" of first clamping arm 26. Encasement frames 20 is attached to each of said flanges 16 through the opening 50 located between slip-on arm 29 and upright base 22 by clipping encasement frame 20 to flange 16 through the opening 50.

FIG. 7 also depicts first bracket arm 24 and second bracket arm 28 being provided with knurlings 17 to ease the screwing thereon. Encasement frames 20 are made of G.I. sheet and formed preferably by cold-roll formed and bended. This method and material, however, can be easily modified by any person skilled in the art.

Referring back to FIG. 2, at least four gypsum boards 18 are shown for single-layer fire rating. Gypsum boards 18 being secured by means of screws 19 through knurlings 17 of first bracket arm 24 and second bracket arm 28 configured to enclosed wide flange column 12 for fire protection.

Figure 5:
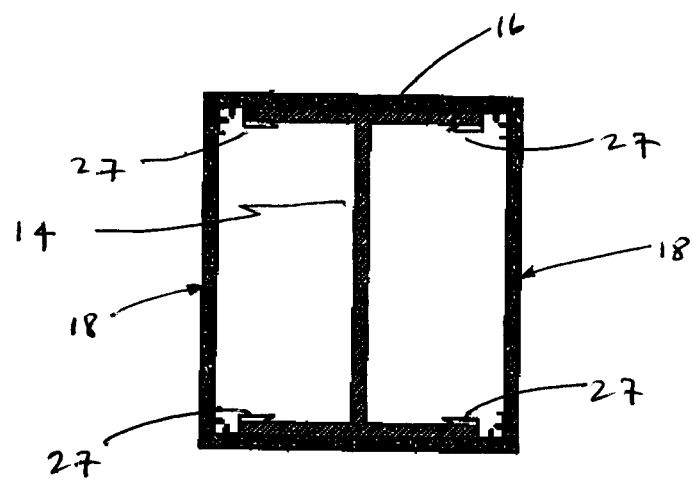
FIG. 5 shows the sectional view of fire protection system for wide flange steel column of FIG. 1.

FIG. 5 shows the sectional view of column system 10 depicting the second clamping arm 27 being clipped to flanges 16.

Figure 3:
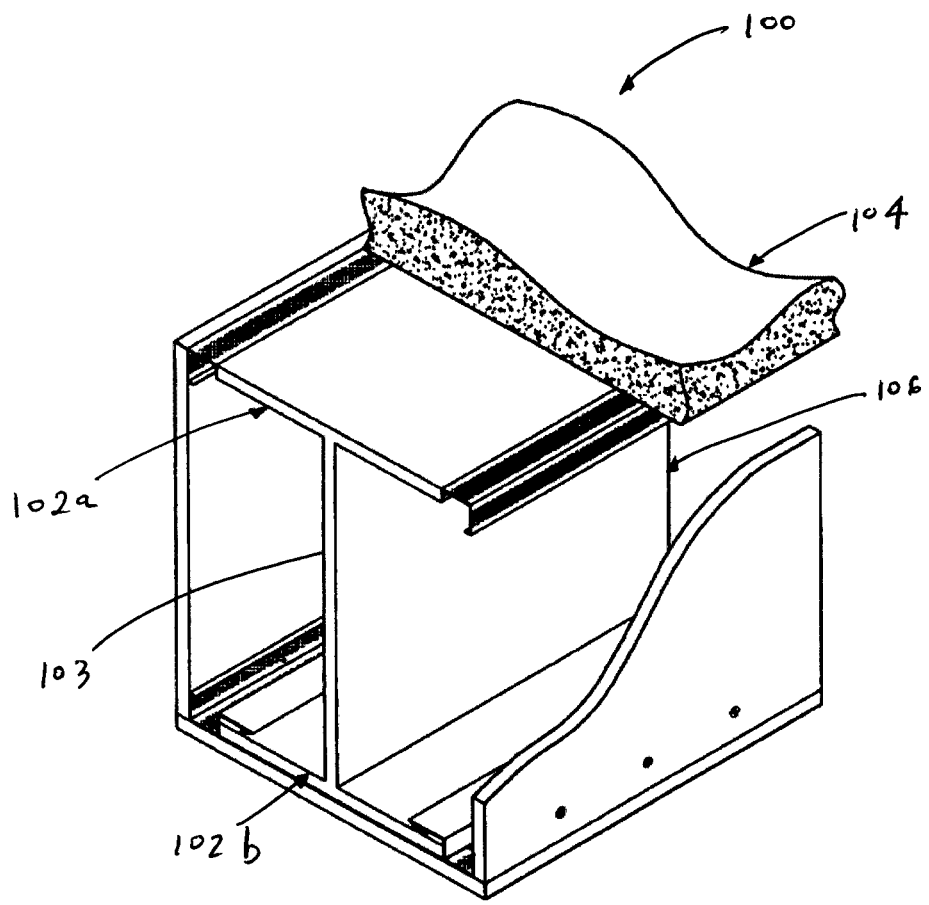
FIG. 3 shows the perspective view of fire protection system for wide flange steel beam according to the present invention.

Referring now to FIG. 3 of the drawings, there is shown the perspective view of fire protection system for wide flange steel beam generally designated as 100. Beam system 100 serves as beam support for concrete slab 104 and is commonly applied to floorings of multi-story structures. Beam flange 102a is being fixedly connected to slab 104 and serves as support structure thereto. Beam system 100 comprises wide flange beam 106 being defined by a horizontal web 103 and a pair of laterally opposing flanges 102a and 102b extending at right angles from said horizontal web 103.

Figure 4:
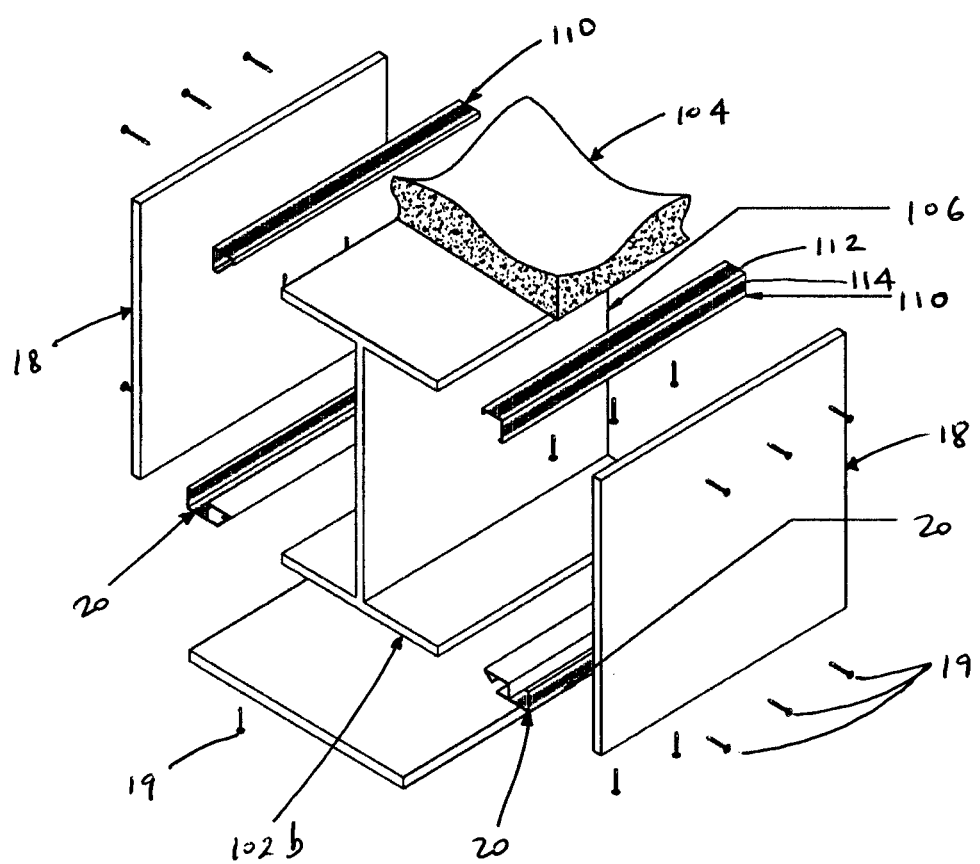
FIG. 4 shows the exploded view of fire protection system for wide flange steel beam according to the present invention.

FIG. 4 shows the exploded view of beam system 100. There is shown a pair of slip-on encasement frames 20, each being slipped longitudinally to one of said flanges particularly flange 102b. Encasement frames 20 being used in beam system 100 is similar to column system 10 and was fully discussed in preceding paragraphs in view of FIG. 7.

Referring back to FIG. 4, a pair of lipped angle frames 110 is defined by a horizontal arm 112 and vertical arm 114 extending downwardly from said horizontal arm 112 are shown. Lipped angle frames 110 has a shape of inverted letter L.

Figure 6:
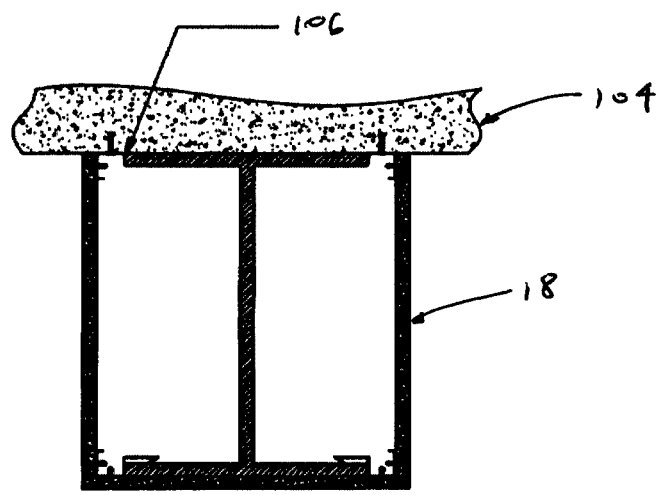
FIG. 6 shows the sectional view of fire protection system for wide flange steel beam of FIG. 3.
Figure 8:
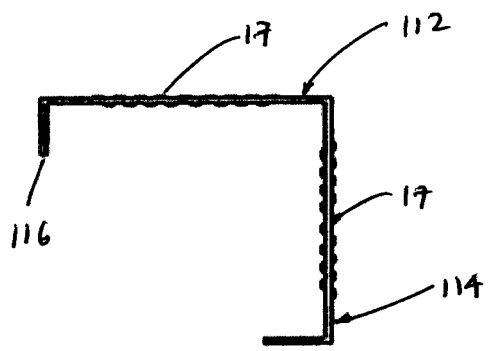
FIG. 8 shows the sectional view of the lipped angle frame according to present invention.
Figure 10:
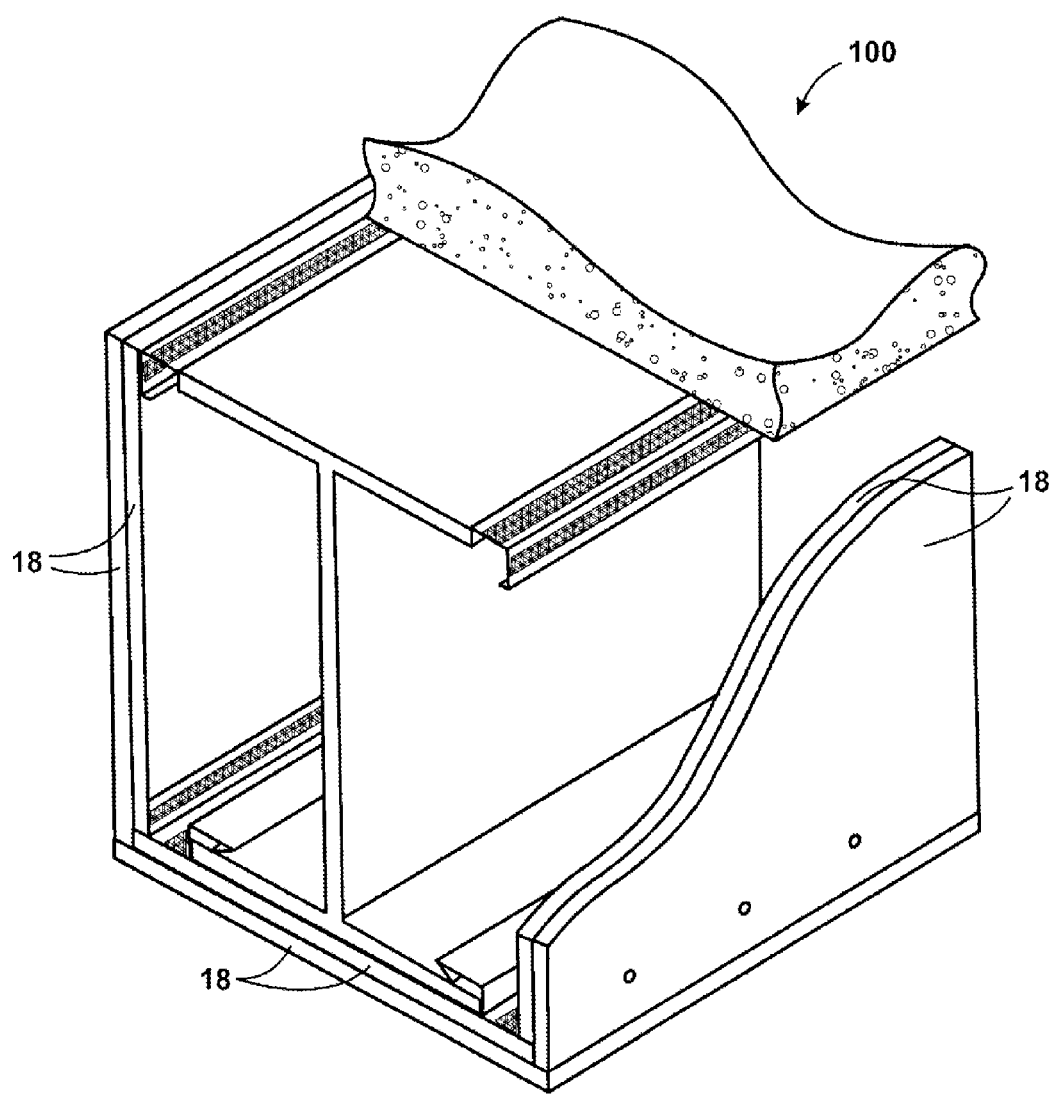
FIG. 10 is the perspective view of fire protection system for wide flange steel beam showing a multi-layered gypsum boards according to the present invention.

Sectional view of lipped angle frame 110 can be seen in FIG. 8 wherein the horizontal arm 112 and vertical arm 114 being provided inwardly with lipped edges 116 and wherein said horizontal arm 112 configured to be fixedly connected to slab 104. Horizontal arm 112 and vertical arm 114 are also provided with knurlings 17 for is screwably connecting thereto gypsum boards 18 with ease. Lipped angle frames 110 are made of G.I. sheet and formed preferably by cold-roll formed and bended As depicted in FIG. 6, at least three gypsum boards 18 is required for every layer depending on fire ratings but it can be increased into a multi-layer depending on fire-ratings as shown in FIG. 10. Gypsum boards 18 are screwably connected by means of screws 19 to vertical arm 114, first bracket arm 24 and second bracket arm 28 thereby enclosing wide flange beam 106 for fire protection.

Having thus described the preferred embodiment of this invention, it should be understood that numerous structural modifications and adaptations such as change in size, shapes, quantity and material may be apparent to those persons skilled in the art without departing from the spirit of the invention.

The invention claimed is:

1. A fire protection system for wide flange steel columns having a vertical web and a pair of laterally opposing flanges extending at right angles from said vertical web comprising:
   a slip-on encasement frame being defined by an upright base having a pair of lateral ends, a first bracket arm being transversely provided at one of said lateral ends, a bracket lip extending inwardly from said first bracket arm towards the other lateral end, a first clamping arm being disposed parallel to said first bracket arm at a predetermined location between said lateral ends thereby defining a second bracket arm between said first bracket arm and said first clamping arm, a second clamping arm extending at an acute angle from said first clamping arm away from said first bracket arm, and a slip-on arm extending angularly from said second clamping arm towards said first clamping arm thereby defining an opening between said slip-on arm and upright base wherein said encasement frame being attached longitudinally to each of said flanges by slipping through said opening, and
   at least a single layer of gypsum boards being secured through said first and second bracket arms configured to enclose said wide flange column for fire protection.

2. The fire protection system for wide flange steel columns according to claim 1, wherein said gypsum boards being multi-layered depending on fire ratings.

3. The system for fireproofing wide flange steel columns according to claim 1, wherein said first clamping arm having a variable length depending on a thickness of said flanges.

4. A fire protection system for wide flange steel beams having a horizontal web and a pair of laterally opposing flanges extending at right angles from said horizontal web wherein one of said flanges being fixedly secured to a slab comprising:

- a pair of slip-on encasement frame being defined by an upright base having a pair of lateral ends, a first bracket arm being transversely provided at one of said lateral ends, a bracket lip extending inwardly from said first bracket arm towards the other lateral end, a first clamping arm being disposed parallel to said first bracket arm at a predetermined location between said lateral ends thereby defining a second bracket arm between said first bracket arm and said first clamping arm, a second clamping arm extending at an acute angle from said first clamping arm away from said first bracket arm, and a slip-on arm extending angularly from said second clamping arm towards said first clamping arm thereby defining an opening between said slip-on arm and upright base wherein each of said encasement frame being attached longitudinally to one of said flanges disposed distal to said slab by slipping through said opening,
- a pair of lipped angle frames being defined by a horizontal arm and a vertical arm extending downwardly from said horizontal arm wherein said horizontal and vertical arms being provided inwardly with lipped edges and wherein said horizontal arm configured to be fixedly connected to said slab, and
- at least a single-layer of gypsum boards being secured through said vertical arm, first bracket arm and second bracket arm wherein said gypsum boards being configured to enclose said wide flange beam for fire protection.

5. The fire protection system for wide flange steel beams according to claim 4, wherein said gypsum boards being multi-layered depending on fire ratings.

* * * * *